US009558337B2

(12) United States Patent
Gross

(10) Patent No.: US 9,558,337 B2
(45) Date of Patent: Jan. 31, 2017

(54) METHODS OF CREATING A CORPUS OF SPOKEN CAPTCHA CHALLENGES

(71) Applicant: The John Nicholas and Kristin Gross Trust, Berkeley, CA (US)

(72) Inventor: John Nicholas Gross, Berkeley, CA (US)

(73) Assignee: John Nicholas and Kristin Gross Trust, Berkeley, CA (US), U/A/D April 13, 2010

( * ) Notice: Subject to any disclaimer, the term of this patent is extended or adjusted under 35 U.S.C. 154(b) by 0 days.

(21) Appl. No.: 14/792,370

(22) Filed: Jul. 6, 2015

(65) Prior Publication Data
US 2015/0310198 A1 Oct. 29, 2015

Related U.S. Application Data

(63) Continuation of application No. 14/517,453, filed on Oct. 17, 2014, now Pat. No. 9,075,977, which is a continuation of application No. 13/939,993, filed on Jul. 11, 2013, now Pat. No. 8,868,423, which is a

(60) Provisional application No. 61/074,979, filed on Jun. 23, 2008.
(Continued)

(51) Int. Cl.
| G06F 7/04 | (2006.01) |
| G06F 21/32 | (2013.01) |
| G10L 17/26 | (2013.01) |
| G10L 13/08 | (2013.01) |
| G10L 13/027 | (2013.01) |
| G10L 17/22 | (2013.01) |

(Continued)

(52) U.S. Cl.
CPC ............ *G06F 21/32* (2013.01); *G10L 13/027*
(2013.01); *G10L 13/08* (2013.01); *G10L 17/00*
(2013.01); *G10L 17/22* (2013.01); *G10L 17/26*
(2013.01); *G10L 15/22* (2013.01)

(58) Field of Classification Search
CPC ............ G10L 15/00; G06F 7/04; G06F 15/16; H04L 9/32
USPC ....... 704/246, 243, 244, 256.4, 273; 705/18, 705/14.69; 379/168; 455/410; 709/225; 726/2, 726/23, 7
See application file for complete search history.

(56) References Cited

U.S. PATENT DOCUMENTS

| 4,441,201 A | 4/1984 | Henderson et al. |
| 5,774,837 A | 6/1998 | Yeldener et al. |
| 5,897,616 A | 4/1999 | Kanevsky et al. |

(Continued)

FOREIGN PATENT DOCUMENTS

| EP | 2045754 A1 | 4/2009 |
| WO | 2008025019 | 2/2008 |

OTHER PUBLICATIONS

"Guess-a-Sketch," web.archive.org/web/. ./GAS.html, Nov. 24, 2002, 5 pages.

(Continued)

*Primary Examiner* — Michael Colucci
(74) *Attorney, Agent, or Firm* — PatentBest; Andrew McAleavey

(57) ABSTRACT

Methods of creating a corpus of spoken CAPTCHA challenges are disclosed. The methods involve training a computing system with samples of human voices and computer synthesized voices articulating a set of reference challenge items, scoring the reference challenge items based on differences in articulation between human and machine articu- (Continued)

lation of each challenge item, and selecting suitable challenge items from among the reference challenge items based on the score.

18 Claims, 6 Drawing Sheets

Related U.S. Application Data continuation of application No. 12/484,837, filed on Jun. 15, 2009, now Pat. No. 8,489,399.

(51) Int. Cl.
*G10L 17/00* (2013.01)
*G10L 15/22* (2006.01)

(56) References Cited

U.S. PATENT DOCUMENTS

| | | | |
|---|---|---|---|
| 5,933,803 A | 8/1999 | Ojala | |
| 5,940,799 A | 8/1999 | Bruckert et al. | |
| 5,991,617 A * | 11/1999 | Powell | H04W 12/12 455/403 |
| 6,014,441 A | 1/2000 | Mark | |
| 6,157,912 A | 12/2000 | Kneser et al. | |
| 6,195,698 B1 | 2/2001 | Lillibridge et al. | |
| 6,208,970 B1 | 3/2001 | Ramanan | |
| 6,397,181 B1 * | 5/2002 | Li | G10L 15/1815 704/242 |
| 6,546,369 B1 | 4/2003 | Buth et al. | |
| 6,681,205 B1 * | 1/2004 | San Martin | G10L 17/24 704/243 |
| 6,697,769 B1 | 2/2004 | Goodman et al. | |
| 6,851,051 B1 | 2/2005 | Bolle et al. | |
| 6,879,956 B1 | 4/2005 | Honda et al. | |
| 7,149,899 B2 * | 12/2006 | Pinkas | G06F 21/36 713/181 |
| 7,222,072 B2 | 5/2007 | Chang | |
| 7,496,509 B2 * | 2/2009 | Navratil | G06K 9/6226 704/243 |
| 7,505,946 B2 | 3/2009 | Chellapilla et al. | |
| 7,516,220 B1 * | 4/2009 | Stiert | G06F 21/55 709/203 |
| 7,603,706 B2 | 10/2009 | Donnelly et al. | |
| 7,680,891 B1 * | 3/2010 | Pongsajapan | G06Q 10/107 709/206 |
| 7,725,395 B2 | 5/2010 | Rui et al. | |
| 7,797,191 B2 | 9/2010 | Cotten et al. | |
| 7,827,265 B2 | 11/2010 | Cheever et al. | |
| 7,841,940 B2 | 11/2010 | Bronstein | |
| 7,917,508 B1 | 3/2011 | Baluja et al. | |
| 7,929,805 B2 | 4/2011 | Wang et al. | |
| 7,945,952 B1 | 5/2011 | Behforooz | |
| 8,005,197 B2 | 8/2011 | Baird et al. | |
| 8,019,127 B2 | 9/2011 | Misra | |
| 8,032,481 B2 | 10/2011 | Pinckney et al. | |
| 8,032,483 B1 | 10/2011 | Haveliwala et al. | |
| 8,036,902 B1 | 10/2011 | Strom et al. | |
| 8,145,914 B2 | 3/2012 | Steeves | |
| 8,209,741 B2 * | 6/2012 | Elson | G06F 21/36 726/2 |
| 8,391,771 B2 | 3/2013 | Goodman et al. | |
| 8,473,336 B1 * | 6/2013 | Simmons | G06Q 30/00 705/14.1 |
| 2002/0013708 A1 | 1/2002 | Walker et al. | |
| 2003/0004719 A1 | 1/2003 | Yuschik | |
| 2003/0033145 A1 | 2/2003 | Petrushin | |
| 2003/0083878 A1 | 5/2003 | Lee et al. | |
| 2003/0093280 A1 | 5/2003 | Oudeyer | |
| 2003/0125944 A1 | 7/2003 | Wohlsen et al. | |
| 2003/0163316 A1 | 8/2003 | Addison et al. | |
| 2003/0182119 A1 * | 9/2003 | Junqua | G10L 15/24 704/246 |
| 2004/0019485 A1 | 1/2004 | Kobayashi et al. | |
| 2004/0102975 A1 | 5/2004 | Eide | |
| 2004/0249628 A1 | 12/2004 | Chelba et al. | |
| 2004/0254793 A1 | 12/2004 | Herley et al. | |
| 2005/0066201 A1 | 3/2005 | Goodman et al. | |
| 2005/0071163 A1 | 3/2005 | Aaron et al. | |
| 2005/0105712 A1 | 5/2005 | Williams et al. | |
| 2005/0114137 A1 | 5/2005 | Saito et al. | |
| 2005/0114705 A1 | 5/2005 | Reshef et al. | |
| 2005/0125226 A1 | 6/2005 | Magee | |
| 2005/0159950 A1 | 7/2005 | Roth et al. | |
| 2005/0171851 A1 * | 8/2005 | Applebaum | G06F 21/32 705/18 |
| 2005/0185847 A1 | 8/2005 | Rowe | |
| 2005/0228641 A1 | 10/2005 | Chelba et al. | |
| 2005/0267752 A1 * | 12/2005 | Navratil | G10L 17/04 704/244 |
| 2006/0074677 A1 | 4/2006 | DeSimone | |
| 2006/0248019 A1 | 11/2006 | Rajakumar | |
| 2006/0277045 A1 | 12/2006 | Gleason | |
| 2007/0016689 A1 | 1/2007 | Birch | |
| 2007/0018393 A1 | 1/2007 | Ritter et al. | |
| 2007/0026372 A1 | 2/2007 | Huelsbergen | |
| 2007/0043681 A1 | 2/2007 | Morgan et al. | |
| 2007/0071206 A1 * | 3/2007 | Gainsboro | H04M 3/2281 379/168 |
| 2007/0073630 A1 | 3/2007 | Greene et al. | |
| 2007/0112570 A1 | 5/2007 | Kaneyasu | |
| 2007/0113294 A1 | 5/2007 | Field et al. | |
| 2007/0143624 A1 * | 6/2007 | Steeves | G06F 21/36 713/182 |
| 2007/0162761 A1 | 7/2007 | Davis et al. | |
| 2007/0165821 A1 | 7/2007 | Altberg et al. | |
| 2007/0192849 A1 * | 8/2007 | Golle | G06F 21/34 726/16 |
| 2007/0234423 A1 | 10/2007 | Goodman et al. | |
| 2007/0250920 A1 * | 10/2007 | Lindsay | G06F 21/31 726/7 |
| 2007/0271830 A1 | 11/2007 | Holt et al. | |
| 2007/0280436 A1 | 12/2007 | Rajakumar | |
| 2007/0282605 A1 | 12/2007 | Rajakumar | |
| 2008/0072293 A1 | 3/2008 | D'Urso | |
| 2008/0140420 A1 | 6/2008 | Lee | |
| 2008/0154678 A1 * | 6/2008 | Botelho | G06Q 30/02 705/14.69 |
| 2008/0175174 A1 | 7/2008 | Altberg et al. | |
| 2008/0216163 A1 * | 9/2008 | Pratte | G06F 21/36 726/7 |
| 2008/0295175 A1 * | 11/2008 | Ansari | H04L 63/1416 726/23 |
| 2009/0012855 A1 | 1/2009 | Jamal et al. | |
| 2009/0013391 A1 | 1/2009 | Ernst | |
| 2009/0055193 A1 * | 2/2009 | Maislos | G06F 21/32 704/273 |
| 2009/0077628 A1 * | 3/2009 | Elson | G06F 21/36 726/2 |
| 2009/0077629 A1 | 3/2009 | Douceur et al. | |
| 2009/0113294 A1 * | 4/2009 | Sanghavi | G06F 17/211 715/269 |
| 2009/0138723 A1 * | 5/2009 | Nyang | G06F 21/36 713/182 |
| 2009/0150983 A1 | 6/2009 | Saxena et al. | |
| 2009/0204819 A1 | 8/2009 | Parker | |
| 2009/0235327 A1 * | 9/2009 | Jakobsson | G06F 21/31 726/2 |
| 2009/0241174 A1 | 9/2009 | Rajan et al. | |
| 2009/0249476 A1 | 10/2009 | Seacat | |
| 2009/0259468 A1 * | 10/2009 | Schroeter | G10L 17/20 704/246 |
| 2009/0260068 A1 * | 10/2009 | Hariharan | H04L 9/32 726/7 |
| 2009/0297064 A1 | 12/2009 | Koziol et al. | |
| 2009/0309698 A1 * | 12/2009 | Headley | G06F 21/316 340/5.52 |
| 2010/0031330 A1 * | 2/2010 | Von Ahn | G06F 21/36 726/5 |

(56) References Cited

U.S. PATENT DOCUMENTS

2010/0049526 A1  2/2010  Lewis et al.
2010/0077210 A1  3/2010  Broder et al.

OTHER PUBLICATIONS

"GWAP," http://blog.gwap.com/2008/05/hellow-world.html, May 13, 2008, 3 pages.
Aaron, Andy et al. "Conversational Computers." Scientific American, Jun. 2005, 6 pages.
Anonymous; "Speaker Verification Testing Final Report Draft 1.0," International Biometric Group, 2004, 31 pages.
Arbel, Eran et al; "An automated method for distinguishing between humans and computers using voice," U.S. Appl. No. 60/891,042, filed Feb. 22, 2007, 4 pages.
Arrenius, Lisa; "Speech Synthesis on the World Wide Web: Evaluation of the Uppsala University Internet Portal," Master's thesis in Computational Linguistics, Jun. 4, 2004, 61 pages.
Baird, Henry et al.; "Human interactive proofs and document image analysis," in Proc., IAPR 2002 Workshop on Document Analysis Systems, (Princeton, NJ), Aug. 2002, 12 pages.
Bentley and C. L. Mallows. Captcha challenge strings: Problems and improvements. In Proc. IS&T/SPIE Conf. on Document Recognition & Retrieval XIII, San Jose, CA, Jan. 2006, pp. 1-7.
Beutnagel, M. et al.; "The AT&T Next-Gen TIS System," http://www.research.att.com/projects/tts, 1999, 4 pages.
Bigham, J.P. et al., "Evaluating existing audio CAPTCHAs and an interface optimized for non-visual use," in proceedings of ACM CHI 2009 Conference on Human Factors in Computing Systems, Apr. 2009, pp. 1829-1838.
Bohr et al.; "Improving auditory CAPTCHA security." ISR Tech. rep., University of Maryland, College Park, MD, 2008.
Golle, P.; "Machine learning attacks against the Asirra CAPTCHA," in proceedings of the 15th ACM Conference on Computer and Communications Security, Alexandria, Virginia, USA, Feb. 2008, 535-542.
Gossweiler, Rich et al.; "What's Up CAPTCHA? A CAPTCHA Based on Image Orientation," WWW 2009, Apr. 20-24, 2009, Madrid, Spain, 10 pages.
Guess-a-Sketch, web.archive.org/web/. ./GAS.html, Nov. 24, 2002, 5 pages.
Gwap, http://blog.gwap.com/2008/05/hellow-world.html, May 13, 2008, 3 pages.
International Search Report and Written Opinion for PCT/US2009/047413, mailed Oct. 15, 2009, 18 pages.
International Search Report and Written Opinion for PCTIUS2009/047413, mailed Oct. 15, 2009, 18 pages.
Kochanski, G., Lopresti, D., and Shih, C.; "A Reverse Turing Test Using Speech," Seventh International Conference on Spoken Language Processing, Sep. 2002.
Lopresti, Daniel; "Leveraging the CAPTCHA Problem," Presented at the Second International Workshop on Human Interactive Proofs, Bethlehem, PA, May 2005, 15 pages.
Markkola, Anu et al.; "Accessible Voice CAPTCHAs for Internet Telephony," Symposium on Accessible Privacy and Security (SOAPS) 2008, Jul. 23, 2008, Pittsburgh, PA, USA, 2 pages.
Mori, Greg et al.; "Recognizing Objects in Adversarial Clutter: Breaking a Visual CAPTCHA," University of California Berkeley Computer Science Department, 2003, 8 pages.
Nass, Clifford et al.; "Does Computer-Synthesized Speech Manifest Personality? Experimental Tests of Recognition, Similarity-Attraction, and Consistency-Attraction," Journal of Experimental Psychology: Applied 2001, vol. 7, No. 3, 171-181.
Pope, Clark et al.; Abstract of "Is It Human or Computer? Defending E-Commerce with Captchas," IT Professional, vol. 7, No. 2, Mar./Apr. 2005, 1 page.
Reynolds, Douglas et al.; "Automatic Speaker Recognition Recent Progress, Current Applications, and Future Trends," Presented at the AAAS 2000 Meeting Humans, Computers and Speech Symposium, Feb. 19, 2000, 36 pages.
Reynolds, Douglas; "Automatic Speaker Recognition: Current Approaches and Future Trends," This paper is based in part on the tutorial "Speaker Verification: From Research to Reality" by D.A. Reynolds and L.P. Heck, ICASSP 2001, 6 pages.
Schlaikjer. "A Dual-Use Speech CAPTCHA: Aiding Visually Impaired Web Users while Providing Transcriptions of Audio Streams," Technical Report CMU-LTI-07-014, Carnegie Mellon University. Nov. 2007.
Schuckers, Stephanie; "Spoofing and Anti-Spoofing Measures," Information Security Technical Report, vol. 7, No. 4 (2002), pp. 56-62.
Stone, Jonathan; "A Guide to Speaker Verification," Produced by ICR Speech Solutions & Services, Oct. 28, 2003, 11 pages.
Thuras, Dylan; "The Turing Test and Machine Intelligence," http://htmltimes.com/turing-test-machine-intelligence.php, Nov. 4, 2008, 3 pages.
Tsz-Yan Chan; "Using a test-to-speech synthesizer to generate a reverse Turing test," Tools with Artificial Intelligence, 2003. Proceedings. 15th IEEE International Conference on, vol., No. pp. 226-232, Nov. 3-5, 2003.
Von Ahn, Luis et al. "Peekaboom: a game for locating objects in images," Proceedings of the SIGCHI conference on Human Factors in computing systems, Apr. 22-27, 2006, Montreal, Quebec, Canada, 23 pages.
Von Ahn, Luis et al.; "Labeling Images with a Computer Game," CHI 2004, Apr. 24-29, 2004, Vienna, Austria, 8 pages.

* cited by examiner

FIG. 4A

Please speak the text in the box below into the microphone
using your normal voice The quick brown fox jumps over a lazy dog

FIG. 4B

Please look at the picture below and using your normal voice
speak into the microphone and tell me what the person is doing:

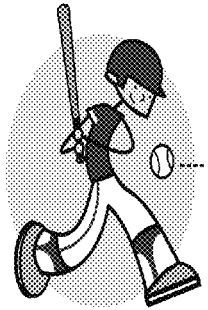

FIG. 4C

Please look at the picture below and using your normal voice speak only one
of the responses below that you would give for the other person into the
microphone:

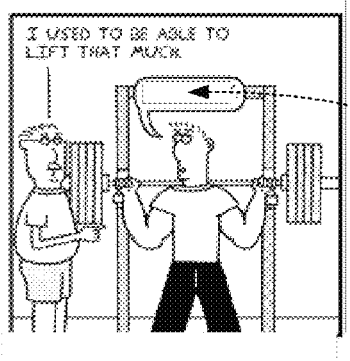

Yeah right old man
You don't look like a spinach eater now
I'm just warming up ... I can really do twice this much
My cellphone is ringing

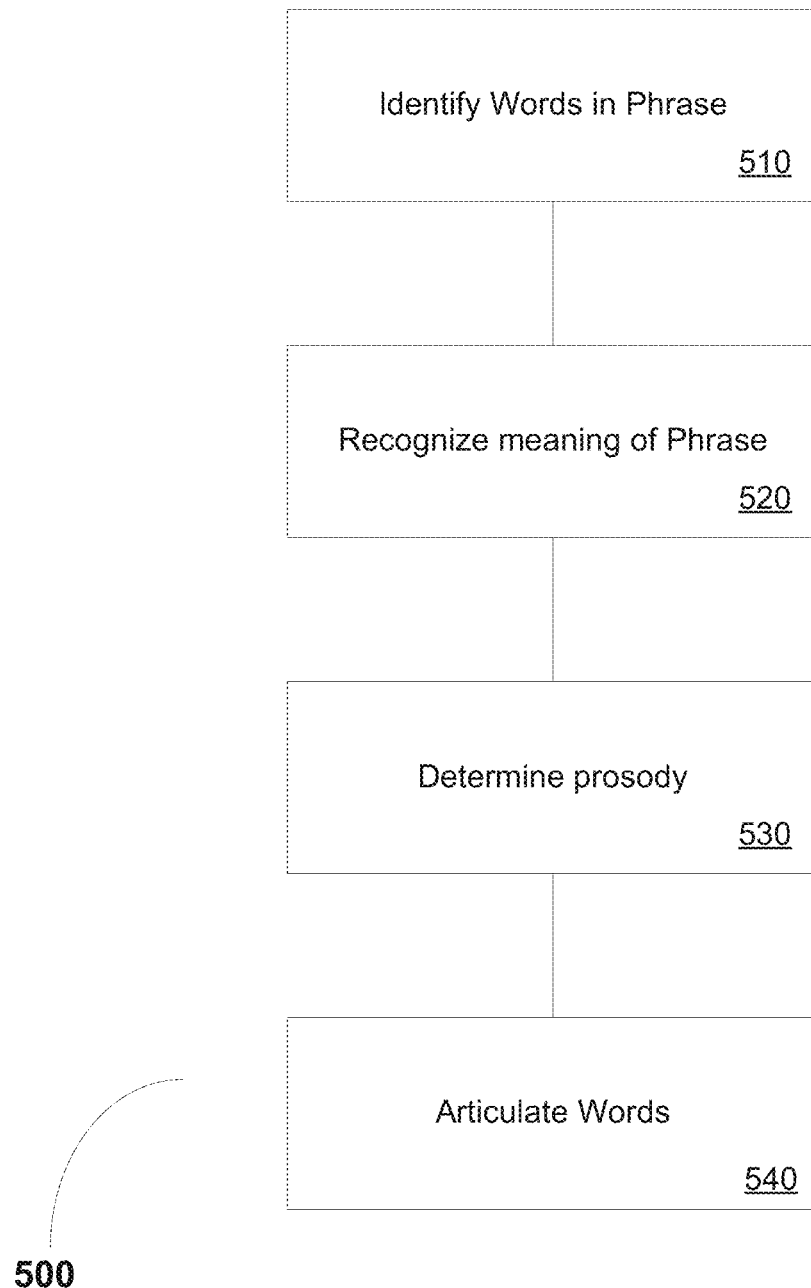
FIGURE 5: PRIOR ART

FIGURE 6: PRIOR ART
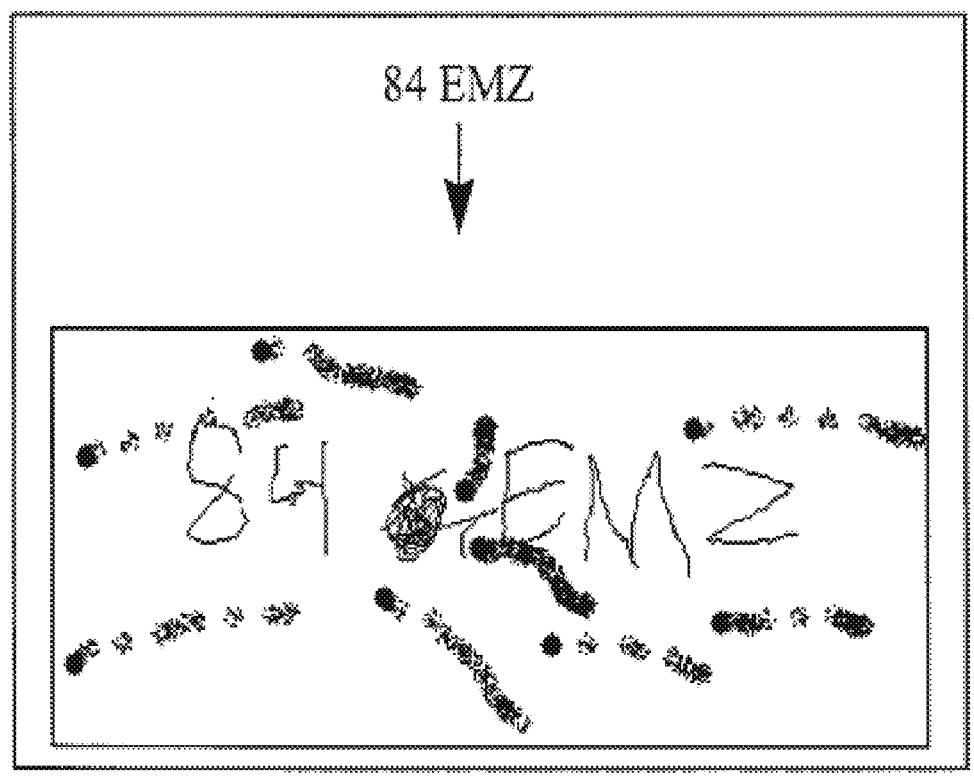

METHODS OF CREATING A CORPUS OF SPOKEN CAPTCHA CHALLENGES

RELATED APPLICATION DATA

This application is a continuation of U.S. patent application Ser. No. 14/517,453, filed Oct. 17, 2014, which is a continuation of U.S. patent application Ser. No. 13/939,993, filed on Jul. 11, 2013, which is a continuation of U.S. patent application Ser. No. 12/484,837, filed Jun. 15, 2009, now U.S. Pat. No. 8,489,399. That application claims the benefit under 35 U.S.C. 119(e) of the priority date of Provisional Application Serial no. 61/074,979 filed Jun. 23, 2008, which is hereby incorporated by reference. The application is further related to the following applications, all of which were filed on Jun. 15, 2009 and incorporated by reference herein:

CAPTCHA Using Challenges Optimized for Distinguishing Between Humans and Machines; Ser. No. 12/484,800, filed Jun. 15, 2009 and issued Jul. 23, 2013 as U.S. Pat. No. 8,494,854; and System & Method for Generating Challenge Items for CAPTCHAs; Ser. No. 12/484,870, filed Jun. 15, 2009 and issued Feb. 19, 2013 as U.S. Pat. No. 8,380,503.

FIELD OF THE INVENTION

The present invention relates to electronic systems for detecting and differentiating input provided by humans and machines. These systems are used primarily in Internet applications for verifying that data originating from a source is from a human, and not from an unauthorized computer program/software agent/robot. In other applications entities can be fingerprinted to detect unauthorized accesses regardless of their origin.

BACKGROUND

CAPTCHA (Completely Automatic Public Turing Tests To Tell Humans And Computers Apart) systems are well known in the art. Examples of such are used by Yahoo! (Gimpy type), Xerox PARC (Baffle type); so-called Bongo, Pix and Pessimal types are also known in the art. One of the first such visual based systems is described in U.S. patent application Ser. No. 10/790,611 to Reshef, which is hereby incorporated by reference herein.

Generally speaking, the goal of visual based CAPTCHAs is to present an optical image which is only decipherable/comprehensible by a human. To this end, the bulk of these systems rely primarily on some combination of pseudorandom letters and numbers which are placed in front of an obfuscating background, or subjected to visual degradation to make them machine-unrecognizable. A good background on such technologies can be found in the article "Is it Human or Computer? Defending E-Commerce with Captchas," by Clark Pope and Khushpreet Kaur in IT PRO, March-April 2005, p. 43-49, which is hereby incorporated by reference herein. An example of a typical CAPTCHA of the prior art is shown in FIG. 6. The person looking at the image presented would have to determine that the text shown corresponds to the characters "84EMZ."

An article entitled What's Up CAPTCHA?—A CAPTCHA Based On Image Orientation by Gossweiler et al. incorporated by reference herein makes use of social feedback mechanisms to select appropriate challenge materials for visual CAPTCHAs. The integration of aggregated human feedback allows for better selection of CAPTCHAs that are best optimized for discriminating against machines.

Recently, however, several sophisticated machine vision systems have achieved significant success in "breaking" the conventional optical CAPTCHA systems. For an example of such system, see "Recognizing Objects in Adversarial Clutter: Breaking a Visual CAPTCHA" by Mori and Malik, also incorporated by reference herein and which is available at the University of California Berkeley Computer Science Department website. Thus, traditional forms of CAPTCHA appear to be at risk of becoming obsolete before they gain widespread adoption.

Audio CAPTCHAs are also known in the art. For an example of such system please see the above article to Pope and Kaur, page 45. Generally speaking, these types of systems take a random sequence of recordings of words, numbers, etc., combine them, and then ask the user to input via keyboard or mouse whatever is "heard" by the user into the system to determine if the message is comprehended. A drawback of this approach, of course, is that speech recognizers are improving rapidly; an article by Reynolds and Heck entitled "Automatic Speaker Recognition Recent Progress, Current Applications, and Future Trends" presented at AAAS 2000 Meeting Humans, Computers and Speech Symposium 19 February 2000—incorporated by reference herein—makes it clear that machines are in fact better analyzers and recognizers of speech than are humans at this point. Consequently, audio CAPTCHAs of this type are similarly doomed to failure at this point.

The Reynolds et al article also notes that speech verification systems are well-known in the art. These systems are basically used as a form of human biometric analyzer, so that a person can access sensitive information over a communications link using his/her voice. A voice print for the particular user is created using a conventional Hidden Markov Model (HMM) during an enrollment/training session. Later when the user attempts to access the system—for example, in a banking application the user may wish to transfer funds from an account—the system compares certain captured audio data from the user against the prior recording to see if there is a sufficiently close biometric match. Identities are typically confirmed by measuring such intrinsic personal traits as lung capacity, nasal passages and larynx size. Again, since speech recognizers are extremely accurate in evaluating speech data, a very reliable verification can be made to determine if the identity of the person matches the prior recorded voice print. Speaker verification systems are well-known and are disclosed, for example in such references as U.S. Pat. No. 5,897,616; 6,681,205 and Publication No. 20030125944 which are incorporated by reference herein.

Another article by Shucker—Spoofing and Anti-Spoofing Measures, Information Security Technical Report, Vol. 7, No. 4, pages 56-62, 2002 explains that these verification systems are very hard to fool with tape recording equipment and the like, because such systems cannot duplicate the physical characteristics noted above. Thus, some speaker-verification technology has ways of testing for "liveness." They specifically analyze for acoustic patterns suggesting that the voice has been recorded using a process called anti-spoofing. Another application of this technique for fingerprinting is also described generally in U.S. Pat. No. 6,851,051 to Bolle et al. which is incorporated by reference herein. Other biometric techniques for uniquely differentiating humans apart are disclosed in US Publication No. 20050185847A1 to Rowe which is also incorporated by reference herein.

To date, therefore, while verification systems have been used for distinguishing between humans, they have been designed or employed on a limited basis for the purpose of distinguishing between a computer speaking and a human speaking as part of a CAPTCHA type tester/analyzer. This is despite the fact that a recent article entitled "The Artificial of Conversation" published at: http://htmltimes(dot)com/turing-test-machine-intelligence(dot)php implies that conventional Turing tests do not even bother examining computer system vocalizations since they are too difficult.

A recent article entitled "Accessible Voice CAPTCHAs for Internet Telephony" by Markkola et al. incorporated by reference herein describes a Skype challenge system that requires the user to speak a number of random digits. This illustrates that there is known value in using spoken CAPTCHAs.

Some recent filings by Rajakumar (US Publication No. 20070280436, 20070282605 and 20060248019) also incorporated by reference herein also discuss the use of a voice database for registering the names of known fraudsters. Thereafter when a person attempts access the system can detect whether the person calling is already registered and is therefore blocked based on his/her voiceprint.

A further filing by Maislos et al. (US Publication No. 20090055193) (Ser. No. 12/034,736) is also incorporated by reference herein. The Maislos system—while purportedly using voice to differentiate between humans and computing systems, and even different demographic groups—is only recently filed and does not contain many details on how to optimize such discrimination, or how to formulate appropriate challenges. Another company identified as Persay is also believed to be researching voice based CAPTHCA systems; see e.g. www(dot)persay(dot)com and accompanying literature for their SPID system.

SUMMARY OF THE INVENTION

An object of the present invention, therefore, is to overcome the aforementioned limitations of the prior art. It will be understood from the Detailed Description that the inventions can be implemented in a multitude of different embodiments. Furthermore, it will be readily appreciated by skilled artisans that such different embodiments will likely include only one or more of the aforementioned objects of the present inventions. Thus, the absence of one or more of such characteristics in any particular embodiment should not be construed as limiting the scope of the present inventions.

A first aspect of the invention concerns a method of identifying a source of data input to a computing system comprising: receiving speech utterance from an entity related to randomly selected challenge text; wherein the challenge text represents a selected set of one more contiguous words which when articulated have a measurable difference in acoustical characteristics between a reference human voice and a reference computer synthesized voice that exceeds a target threshold; processing the speech utterance with the computing system to compute first acoustical characteristics of the entity; and generating a determination of whether the speech utterance originated from a machine or a human.

In preferred embodiments additional steps may be performed including: identifying a first computer synthesized voice that best correlates to the entity; and selecting the randomly selected challenge text based on an identity of the first entity so as to maximize a difference in acoustical characteristics. In addition in preferred embodiments the challenge text can be selected in part based on a confirmation from a human listener that an articulation of such challenge text originated from a computer synthesized voice. Also preferred embodiments may have the steps: soliciting utterances from a plurality of separate computing machines to determine their respective acoustical characteristics; and storing the plurality of associated acoustical characteristics in a database of known computing entities. Multiple samples of individual challenge sentences are preferably collected. The challenge text is preferably selected in part based on a difference in time for rendering such text into audible form by a human and a computing machine.

Some preferred embodiments include a step: granting or denying access to data and/or a data processing device based on the results of the CAPTCHA, including a signup for an email account or a blog posting. For others the step of granting or denying access to an advertisement based on the determination is performed. Other preferred embodiments perform a separate automated visual challenge test so that both visual processing and articulation processing is considered in one or more of the determinations.

For some applications a prosody score associated with the speech utterance is also preferably considered during step (c). The first test text preferably consists of a sentence presented in visual form for the entity to articulate, and/or a sentence presented in audible form for the entity to repeat. The first text data can also consist of a question presented in visual form and further includes an image cue associated with the question as well as a separate set of acceptable responses presented in visual form.

In some preferred embodiments an additional step is performed: selecting one or more second computing systems for separately performing the process based on a performance and/or cost requirement. These one or more second computing systems can be selected based on a language spoken by the entity, an IP address or geographic region associated with the entity, an auction process in which such one more second computing systems bid for the right to process the speech utterance, etc. The challenge text can also be selected based on a detected accent and/or geographic region associated with the entity.

A set of sentences for inclusion as challenge text preferably is based on an articulation difficulty score for a computer synthesis engine. In other cases the sentences are automatically generated based on a measured concatenation difficulty for a set of diphones. In still other applications the set of sentences are extracted automatically from a corpus that includes web logs, newspapers, books and/or the Internet.

Another aspect of the invention concerns a method of implementing a CAPTCHA (Completely Automatic Public Turing Test To Tell Humans And Computers Apart) to identify a source of data input to a computing system comprising: presenting an image CAPTCHA to an entity, which image CAPTCHA includes one or more visually distorted words, phrases or images as a challenge item; receiving a speech utterance from an entity related to the challenge text; processing the speech utterance to generate a determination of whether the speech utterance originated from a machine or a human.

The image CAPTCHA can take various forms, and preferably includes at least two distinct words. The determination preferably includes a first score based on computing acoustical characteristics of the speech utterance, and a second score based on recognizing the speech utterance to determine if the one or more visually distorted words, phrases or images are correctly identified. The scoring can also take into account a time required for the entity to determine the image CAPTCHA. In yet other applications the image CAPTCHA is revealed in distinct stages which span a predetermined time period, and with each stage presenting additional visual information.

Still another aspect concerns a method of identifying a source of data input to a computing system comprising: associating a first challenge item with a first set of individual text descriptors; wherein the first set of text descriptors are based on feedback provided by a group of human reviewers; associating a second challenge item with a second set of individual text descriptors; wherein the second set of individual text descriptors are also based on feedback provided by a group of human reviewers; identifying at least a first reference correlation between at least a first reference text descriptor for the first challenge item and a second reference text descriptor for the second challenge item, including a probability that a human reviewer identifying the first reference text descriptor when presented with the first challenge item also provides the second reference text descriptor when presented with the second challenge item, or vice-versa; presenting the first challenge item to an entity as part of an automated access challenge adapted to distinguish humans from computing machines; receiving speech utterance from the entity related to the first challenge item to determine a first input text descriptor; presenting the second challenge item to the entity as part of the automated access challenge adapted to distinguish humans from computing machines; receiving speech utterance from the entity related to the second challenge item to determine a second input text descriptor; comparing the first and second input text descriptors to identify the reference correlation between them as measured; and generating a determination of whether the speech utterance originated from a machine or a human based on a value of the reference correlation.

The challenge items preferably include an image, a question, or different types, including a first type which includes an image, and a second type which includes a question. The first and second challenge items can also be selected based on a value of the reference correlation.

A further aspect concerns a method of identifying a source of data input to a computing system comprising: receiving speech utterance from an entity related to randomly selected challenge text; processing the speech utterance with the computing system to compute first acoustical characteristics of the entity; comparing the first acoustical characteristics with at least one reference set of acoustical characteristics for a human voice to identify a first score for the speech utterance; comparing the first acoustical characteristics with at least one reference set of acoustical characteristics for a computer synthesized voice in parallel to generate a second score for the speech utterance; generating a determination of whether the speech utterance originated from a machine or a human based on the first score and the second score.

Some of the steps are preferably done by separate entities using separate computing machines, which can participate in an auction to identify the first and/or second scores.

Another aspect concerns a method of identifying a source of data input to a computing system comprising: selecting first test text data to be articulated as a speech utterance by an entity providing input to the computing system; receiving the speech utterance from the entity; generating first recognized speech data from the speech utterance corresponding to the first test text data; processing the first recognized speech data with the computing system to generate an initial determination of whether the speech utterance originated from a machine or a human; optionally repeating steps above based on a confidence score for the initial determination using second test text data, which second test text data is derived dynamically from content presented in the first recognized speech data; and processing the second recognized speech data with the computing system to generate a final determination of whether the speech utterance originated from a machine or a human.

Another aspect is directed to a method of controlling access to a computing system comprising: selecting first test text data to be articulated as a first speech utterance by a first entity providing input to the computing system; storing a voice print for the first entity at the computing system based on the first speech utterance being converted into recognized speech data; wherein the first entity can include either a human or a computer using a synthesized voice; receiving a second speech utterance by a second entity; processing the second recognized speech data with the computing system to determine whether the second speech utterance also originated from the first entity; controlling whether the second entity is allowed to access an account and/or data based on comparing the voice print to the second recognized speech data.

The access is preferably used for one or more of the following:
  a) establishing an online account; and/or
  b) accessing an online account; and/or
  c) establishing a universal online ID; and/or
  d) accessing a universal online ID; and/or
  e) sending email; and/or
  f) accessing email; and/or
  g) posting on a message board; and/or
  h) posting on a web log; and/or
  i) posting on a social network site page;
  j) buying or selling on an auction site; and/or
  k) posting a recommendation for an item/service; and/or
  l) selecting an electronic ad.

Yet another aspect concerns a method of identifying a source of data input to a computing system using prosodic elements of speech comprising: presenting a challenge item to an entity, which challenge item is associated with a reference set of words and associated reference prosodic scores; receiving speech utterance from an entity related to the challenge item including an input set of words; processing the speech utterance with the computing system to compute input prosodic scores of the input set of words; comparing the input prosodic scores and the reference prosodic scores; generating a determination of whether the speech utterance originated from a machine or a human based on the comparing.

Some preferred embodiments include the step: recognizing the input set of words to compute an additional prosodic score based on an identity of the input set of words, and comparing the additional prosodic words to a second reference prosodic score related to a content of the reference set of words. The challenge item is preferably supplemented with visual cues, the visual cues being adapted to induce the reference prosodic scores. The visual cues are preferably selected from a database of visual cues determined by reference to a database of human vocalizations to most likely result in the reference prosodic scores.

Still another aspect involves a method of identifying a source of data input to a computing system using prosodic elements of speech comprising: presenting a challenge item to an entity, which challenge item is associated with a reference set of words and associated prosodic characteristics; receiving speech utterance from an entity related to the challenge item; wherein the reference set of words represents a selected set of one more contiguous words which when vocalized have a measurable difference in prosodic characteristics between a reference human voice and a reference computer synthesized voice that exceeds a target threshold; processing the speech utterance with the computing system to compute first prosodic characteristics of the entity; generating a determination of whether the speech utterance originated from a machine or a human based on the processing.

Some preferred embodiments include the steps: estimating a first computer synthesized voice that best correlates to the entity; and selecting the challenge item based on an identity of the first entity so as to maximize a difference in prosodic characteristics. Other embodiments include further steps: soliciting utterances from a plurality of separate computing machines to determine their respective prosodic characteristics; and storing the plurality of associated prosodic characteristics in a database of known computing entities. Multiple samples of individual challenge sentences are preferably collected. The visual cues are preferably added to induce the entity to vocalize the reference set of words using the reference human voice.

Other aspects concern a method of implementing a CAPTCHA (Completely Automatic Public Turing Test To Tell Humans And Computers Apart) to identify a source of data input to a computing system comprising: training the computing system with samples of human voices and computer synthesized voices articulating a set of reference challenge items; receiving a speech utterance from an entity related to one of the set of reference challenge items; determining with the trained computer system whether the speech utterance was vocalized by a machine or a human.

A set of human test subjects preferably are used to identify whether a reference challenge item was vocalized by a human or a computer prior to using it in the training of the computing system. The reference challenge items are preferably ranked and sorted according to a score provided by the human test subjects, and further including a step: presenting the one of the set of reference challenge items based on the score.

A further aspect concerns a method of implementing a CAPTCHA (Completely Automatic Public Turing Test To Tell Humans And Computers Apart) to identify a source of data input to a computing system comprising: training the computing system with samples of human voices articulating a set of reference challenge items; receiving a speech utterance from an entity related to one of the set of reference challenge items; determining with the trained computer system whether the speech utterance was vocalized by a machine or a human; wherein the computing system uses one or more speech models that are optimized for identifying humans using the set of reference challenge items.

A set of human test subjects preferably are used to identify whether a reference challenge item was vocalized by a human or a computer prior to using it in the training of the computing system. The set of reference challenge items preferably represent a selected set of one more contiguous words which when articulated have a difference in acoustical characteristics between a reference human voice and a reference computer synthesized voice that exceeds a target threshold as measured by a reference group of human listeners, and at least some of the acoustical characteristics are used to train the one or more speech models.

Still another aspect is directed to a method embodied in a computer readable medium for generating challenge data to be used for accessing data and/or resources of an electronic computing system comprising: automatically generating a candidate challenge sentence from a first set of words and phrases using the computing system; automatically generating at least one first utterance from a first machine text to speech system for the candidate challenge sentence using the computing system, the at least one first utterance including first acoustical characteristics; automatically generating at least one second utterance from a human speaker for the candidate challenge sentence using the computing system, the at least one second utterance including second acoustical characteristics; automatically determining a difference in the first and second acoustical characteristics using the computing system to determine a challenge sentence acoustic score for the candidate challenge sentence; automatically storing the at least one first utterance and the at least one second utterance and the candidate challenge sentence in a challenge item database using the computing system for use by an utterance based challenge system when the candidate challenge sentence acoustic score exceeds a target threshold.

Acoustical features of the first utterance and the second utterance are preferably measured, and regions of greatest difference are identified to be used as discriminators. In other embodiments, differences in articulation are preferably measured and scored on a diphone basis. The diphones can be sorted according to their difference between human and machine articulation. Based on such difference words and phrases are preferably selected from a corpus of text in accordance with a diphone score.

In some preferred embodiments a machine articulation statistical language model is compiled based on a plurality of first utterances.

For other preferred embodiments a dialog of multiple challenge sentences based on questions and expected answers to be provided by an entity is compiled. A challenge scenario preferably comprised of the candidate challenge sentence and one or more visual and/or text cues is generated, which challenge scenario is stored in the database.

A natural language engine can also preferably process the words and phrases to generate the candidate challenge sentence. An evaluation/scoring of the syntax difficulty preferably can be made for challenge sentences to determine appropriate candidates that would be more difficult for a challenge natural engine to decode.

In other preferred embodiments the candidate challenge sentence are annotated with prosodic elements to generate an expected prosodic pronunciation of the words and phrases. The candidate challenge sentence preferably are annotated with first prosodic elements found in the at least one first utterance and with second prosodic elements found in the least one second utterance. A difference in the first and second prosodic elements preferably is determined to generate a challenge sentence prosodic score for the candidate challenge sentence.

In other preferred embodiments The candidate challenge sentence preferably is annotated with first content elements for the visual and/or text cues found in the at least one first utterance and with second content elements for the visual and/or text cues found in the least one second utterance. A difference in the first and second content elements preferably is determined to generate a challenge sentence content score for the candidate challenge sentence.

In still other preferred embodiments a time required by the human speaker and a machine speaker to generate the first utterance is measured.

The challenge database can then be used during a processing of input speech by an entity to distinguish between a human and a machine synthesized voice.

Another aspect concerns a method embodied in a computer readable medium of selecting challenge data to be used for accessing data and/or resources of a computing system comprising: providing a first set of diphones using the computing system; generating an articulation score using the computing system based on a machine text to speech (TTS) system articulation of each of the first set of diphones; and selecting challenge text using the computing system to be used in an utterance based challenge system based on the articulation scores. Thereafter speech input by an entity using the challenge item database can be processed to distinguish between a human and a machine synthesized voice.

Another aspect concerns a method embodied in a computer readable medium of selecting challenge data to be used for accessing data and/or resources of a computing system comprising: selecting a candidate challenge item which can include text words and/or visual images; measuring first acoustical characteristics of a computer synthesized utterance when articulating challenge content associated with the candidate challenge item; measuring second acoustical characteristics of a human utterance when articulating the challenge content; generating a challenge item score based on measuring a difference in the first and second acoustical characteristics; and designating the candidate challenge item as a reference challenge item when the challenge item score exceeds a target threshold. Thereafter speech input by an entity using the challenge item database can be processed to distinguish between a human and a machine synthesized voice.

In preferred embodiments the challenge item score is also based on one or more topics associated with the text words and/or visual images and which are identified and measured in the computer synthesized utterance and human utterance respectively. The challenge item score can also be based on prosodic elements associated with the text words and/or visual images and which are identified and measured in the computer synthesized utterance and human utterance respectively. Alternatively or in addition to this, the challenge item score is also based on a collaborative filtering score generated by measuring responses to a sequence of two or more of the candidate challenge items identified in the in the computer synthesized utterances and human utterances respectively. The collaborative filtering score is preferably derived by identifying at least a first reference correlation between at least a first reference text descriptor for a first challenge item and a second reference text descriptor for a second challenge item, including a probability that a human reviewer identifying the first reference text descriptor when presented with the first challenge item also provides the second reference text descriptor when presented with the second challenge item, or vice-versa. Alternatively or in addition to this the collaborative filtering score is derived by identifying at least a first reference correlation between a first challenge item presented in incomplete form, and a predicted response for completing the challenge item.

Still another aspect concerns a method embodied in a computer readable medium of selecting challenge data to be used for accessing data and/or resources of a computing system comprising: defining a plurality of demographic groups, the demographic groups being based on age, sex and/or domicile; providing a plurality of CAPTCHA (Completely Automatic Public Turing Test To Tell Humans And Computers Apart) challenge items consisting of a combination of images and solicited utterances with the computing system; for each of the challenge items using the computing system to compare a first reference response of a machine entity and a second reference response provided by a representative of the demographic group; for each demographic group selecting an optimal set of CAPTCHA challenge items determined by the computing system to yield the greatest response difference over the machine entity. Thereafter speech input by an entity using the challenge item database can be processed to distinguish between a human and a machine synthesized voice based on identifying a demographic group for an entity.

Other aspects of the invention concern a challenge apparatus or system for identifying a source of data input to a computing system comprising one or more software routines implemented in a computer readable medium and adapted to cause the challenge system to perform the aforementioned operations o the various aspects described.

DESCRIPTION OF THE DRAWINGS

FIGS. 4A-4C depict various forms that can be used for presenting content to an entity in accordance with the present invention;

FIG. 5 describes the basic steps required by an entity to decode content and express an utterance related thereto;

FIG. 6 shows a conventional prior art CAPTCHA system based on a visual challenge.

DETAILED DESCRIPTION

Basic Elements & Concepts Employed In Invention

Figure 1:
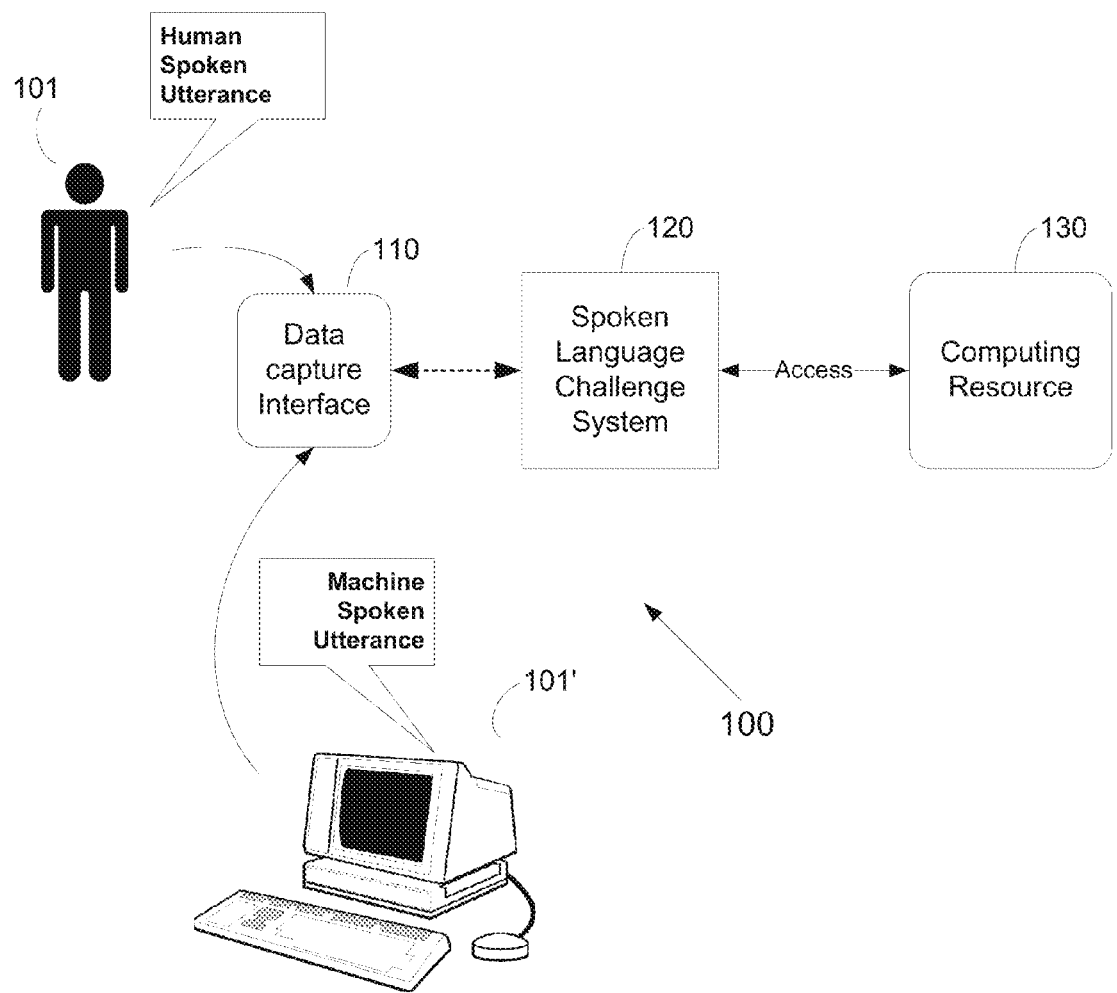
FIG. 1 illustrates a general architecture of a preferred embodiment of an articulated utterance based challenge system of the present invention.

FIG. 1 depicts a typical computing system 100 environment which can benefit from embodiments of the present invention, namely, in allowing flexible control over access to computing resources, data, etc., using a spoken language challenge approach. As can be seen in this figure, an "entity" (which may be a natural person or a machine) 101, 101' provides input to a data capture interface 110. In a preferred embodiment the interface can be based within a GUI or a VUI, including within a web/voice browser, a cell phone, a PDA, a desktop computing system, or similar electronic system including consumer electronic devices (such as set top boxes, cameras, conventional phones, etc.)

Again while the invention relies primarily on extracting audio information from the entity attempting access, other modes of data may be provided at the same time through other mechanisms (i.e., through keyboards, mice, etc.). The invention therefore can be integrated as part of a multimodal input device. A Spoken Language Challenge System 120 is responsible for receiving the input from the entity (i.e., typically in the form of a short speech utterance) and determining whether it is a human or a machine. In most instances the challenge logic of the invention would be implemented as one or more software routines executing on a server computing system. However the invention is not restricted in this fashion, and those skilled in the art will appreciate that some components of the challenge logic could be implemented advantageously on a client side as well or be embodied as firmware/hardware depending on the platform.

Depending on the results of the Spoken Language Challenge System 120 analysis, the entity may be granted access to one or more computing resources 130, which, again, may typically include such things as being allowed to access resources/data of a computing device, access an online game, set up an online account, access an online ID or account, access an account through an interactive voice response system (such as by VXML coded pages), or access other types of data, such as email. For other applications it may be linked as a condition to: a) posting an item (electronic data or URL tags) on a message board, web log, an auction site, a content reviewing site (i.e., books, movies, etc.) etc., b) posting a recommendation for an item/service (i.e., as a recommendation system protector to reduce the effects of improper shilling attempts by third parties; c) sending an email (i.e., a receiving email system may insist on a voice authentication to confirm that the message was communicated by a human, as a tool for reducing spam); d) selecting an electronic ad presented by an advertising system—i.e., as a tool for reducing click fraud. These are but examples of course and other applications will be apparent to those skilled in the art.

Again the implementation will vary from application to application depending on the particular needs of a system operator who desires to prevent/restrict automated machines from obtaining access to certain resources. In a typical example, as noted above, CAPTCHA systems are typically employed to prevent entities from signing up for multiple free email accounts; those skilled in the art will appreciate that there are hundreds of other different applications. One critical aspect of all CAPTCHAs is that they must be easy to use by the majority of the population, or they will simply frustrate users and reduce incentives to utilize a particular computing system. Because the large majority of the population is able to read and articulate basic words, the present invention satisfies this criterion as well. In fact, for many cultures, it is likely that visual CAPTCHAs may be inefficient and/or unusable due to inherent features or limitations of a native alphabet. Furthermore in many cases persons may be visually impaired and unable to use a visual based CAPTCHA. In this respect the present invention can complement such existing systems to provide a wider range of access for such persons.

In general terms, the Spoken Language Challenge System exploits other fundamental strengths that humans have over machines at this time, namely: 1) the ability to rapidly recognize the meaning of a sentence of words; and 2) smoothly articulate the text of such sentence in the form of speech. Humans are trained over several years to understand proper timing, pitch, prosody, phoneme articulation, etc., and articulate/pronounce words with ease. Machines are simply not able practically to duplicate this knowledge or reproduce such fluency. Consequently, as a basic premise it is submitted that a machine "impostor" will be detectable more easily by using human biometric information which must be expressed by an entity attempting to gain access to a computing system, not just simply as "understood" (as in visual and audio CAPTCHAs) by such entity and expressed in text form. The latter limitation of requiring an entity to respond only with text, or mouse clicks, fails to exploit one additional significant human processing/expressive feature which is extremely difficult (if not impossible) to duplicate.

For example, as shown in FIG. 5, the basic functional steps performed by a human reader and speaker are shown in an articulation process 500. These tasks include the following: identifying the words/text of a sentence at 510; understanding a meaning of the sentence at 520; evaluating prosodic aspects of the sentence at 530; and finally at 540 articulating the text of the sentence with correct pronunciation and appropriate prosody.

Currently conventional computing systems can duplicate such tasks, but only with noticeable/detectable side effects. That is, an optical scanner routine and conventional natural language understanding system can perform steps 510-530 with reasonable performance, but not nearly as quickly as a human. More importantly, in performing step 540 a text to speech (TTS) system can articulate the result, but with very noticeable results. Thus while they are able to perform all of these operations in some fashion, they are unable to perform them all in seriatim in real-time to duplicate a human.

For instance suppose one or more of the following sentences are presented to an entity within an interface accompanied by a request to vocalize the same as an input to a challenge system:

I did not permit him to go outside!

I need a permit for my construction.

In doing the same tasks in FIG. 5, a machine imposter must first "see" the text presented (step 510). This task in itself would require some form of optical scanner and character recognition to identify distinct words. The conventional CAPTCHAs, as noted above, in fact rely primarily on being able to fool machines by rendering such text unrecognizable. However, it can be seen that unlike the present invention, such approach only takes advantage of a small fraction of the processing battle which can be imposed on a machine impostor.

After identifying the raw text, the machine imposter must then parse the entire sentence to make sense of the meaning of the phrases (step 520). This, again, typically requires a natural language engine (NLE) which must be fairly advanced and most often "trained" for particular domains to understand pre-defined phrases from a known grammar. In a completely unstructured context devoid of additional cues, a NLE would be impaired and confused trying to "understand" a random sentence of words—particularly sequences which may be designed to exploit frailties in such systems. For example in the sentences above, the system would have to detect very quickly whether the word "permit" was being used as a verb or a noun. This must be identified correctly, of course, to inform a TTS engine of the correct pronunciation. It can be seen that event random text analysis by a NLE without context is extremely challenging, because several aspects of the sentence must be processed very rapidly to perform word/sentence segmentation, abbreviation expansion, numeral expansion, word pronunciation, and homograph disambiguation.

After understanding the sentence, the machine imposter may also have to annotate the output of the desired articulation with appropriate prosodic elements at step 530. Acoustical aspects of prosodic structure also include modulation of fundamental frequency (F0), energy, relative timing of phonetic segments and pauses, and phonetic reduction or modification. For example a phoneme may have a variable duration which is highly dependent on context, such as preceding and following phonemes, phrase boundaries, word stress, phrase boundaries, etc.

For the first sentence therefore there may be different prosodies or emphases that can be appropriately placed on different words. For example, depending on the context, any of the bolded words might be emphasized by a speaker to give a more precise meaning:

I(1) (in the context of who gave permission)

did not(2) (in the context of affirmation/confirmation)

permit him (3) (in the context of who was given permission)

to go outside! (4) (in the context of location)

Others are of course possible to give different meanings. To reinforce a desired meaning and accompanying prosody, the sentence can be presented with visual clues or other sentences to assist the speaker in determining which context is appropriate. Nonetheless as is apparent from the ambiguity of the sentence, it may not be necessary to place too much emphasis on particular prosody or emphasis given by the entity. As a first layer of defense or threshold it may be sufficient to simply detect if at least one reasonable choice is given as a response for the context in question—i.e., that prosody was indeed used in expressing the sentence. The prosody choice may also be tied to a prior statement, such as: Did you say he could go outside? No, I told him he could go to his room. In the context of location being emphasized in the question, the answer should similarly give prosodic emphasis to that same element.

Note that in many cases prosody can be determined solely by reference to acoustical characteristics of the speaker, and without requiring the recognition of words. In some instances it may be desirable nonetheless to compute an additional prosody score based on an identity of the articulated words, and comparing said it to a reference prosodic score related to a content of the overall challenge item set of words.

However step 540 presents the biggest challenge to the machine imposter. To imitate such behavior, a TTS system must know the phonemes to be uttered, which words to accent (i.e., emphasize), and how to intelligently process the sentence to imitate prosodic behavior of a human. Again for each phoneme, the TTS system must decide on the time behavior of the articulation—i.e., duration, intensity stress and intonation, all of which can change the meaning of a statement entirely. Thus the TTS system must be given accurate information by the NL engine. For example in the first sentences above the system would need to know to accent the last syllable of the word "permit" and the second syllable in the second sentence to provide the accurate syntax.

Finally, TTS systems also have significant problems in the actual articulation of speech as noted in step 540. Typically pitch range is restrained controlled because a TTS system may be unsure of how to properly adjust pitch, stress, etc. for a particular phoneme/word. This gives the speech a pronounced and detectable mechanical sound.

Modern TTS systems rely primarily on concatenative synthesis—a technique which relies on extracting model parameters from actual speech waveforms and concatenating them individually to create new utterances. Parts of utterances that have not been previously processed and stored in the database are constructed from smaller units.

The challenges for this technique include the fact that it is computationally extremely complex to determine which waveform "unit" to select in any particular instance, and then how to modify the same to be prosodically correct (i.e., desired pitch, duration, intonation, etc.) as noted above. Other techniques have similar limitations.

To address coarticulation, diphones—representing transitions between phones—are typically used. In the diphone approach, all possible diphones in a particular language are stored, and then they are merged to correspond to the phonetization of the input text. A diphone again is a speech unit consisting of two half-phonemes, or of the phonetic transition in between, e.g. "Cat": silence+c–c+a–a+t–t+ silence Another method, unit selection, collects its speech data from a depository containing units of various lengths, including diphones as well as words and phrases. Each pre-recording is stored in multiple occurrences, pronounced in different prosodic contexts. This type of synthesis requires an extensive storage facility, and has only recently become a popular method, since memories and performance of computers have increased.

From perusing any of a number of speech synthesis sites, including those associated with the most advanced speech synthesis engines (AT&T, IBM, etc.) it is apparent that clipping by TTS systems is very noticeable. That is, transitions between phonemes are often accompanied by sharp distinguishable breaks. Consequently current machine imposters attempting to imitate a human voice merely try to model the human brain's understanding of the parts of speech of a sentence, and make statistical guesses about the proper pronunciation of words. Real-time modeling of phonemes and stress placement are (essentially) impossible tasks at this time.

The present invention is based on the hypothesis that given the complexities of language, a computer will not be able to imitate a human in a manner that will not be detectable - at least not in a way that is not detectable by another computer trained to "listen" for machine impostors. In this latter respect, therefore, while a TTS system may eventually reach "human-like" performance, it will always include small deficiencies, artifacts and tell-tale signature signs of speech synthesis operations which will be observable and measurable by conventional speech recognition systems of equal or better computing capability.

Accordingly the present invention exploits the fundamental premise that speech synthesis systems will invariably lag in function, performance, capability, etc., as compared to speech recognition systems, simply because of the relative complexities of the tasks which systems must perform. The latter has the advantage that it can be trained extensively with millions of examples of human speech, as well as computer speech, to very quickly, easily and accurately differentiate a human from a machine. So in a sense it can be said that the best mechanism for catching a machine impostor is by using another machine as a detector, since the speech "decoding" process is inherently capable of detecting those aspects of a speech "encoding" process which identify a machine synthesized articulation.

In summary, TTS systems at best can merely try to model the human brain's understanding of the parts of speech of a sentence, and make statistical guesses about the proper pronunciation of words. Consequently they will always suffer to some extent from one or more of the following deficiencies:

Pauses

Misplaced stress of phonemes

Misplaced stress of words

Discontinuities between phonemes, syllables

Incorrect prosody

All of which can be detected by a spoken language challenge system. It will be understood, of course, that a spoken language challenge system 120 may not be appropriate for all applications, because they may lack or have limited means for an audio input. Nonetheless, for some applications, particularly in portable systems (such as cell phones, PDAs, regular phones) where there is very little (or no) physical space in a display (or inadequate resolution) for presenting a visual CAPTCHA, it is expected to be far more useful than conventional approaches. Moreover, in some instances, such as IVR systems, the present invention is one of only a few known mechanisms for preventing unauthorized entry by machine impostors.

In some applications a system operator may want to use or even combine different forms of CAPTCHAs for extra security so the present invention could be used to supplement conventional visual and audio based techniques. For example, both visual and audible CAPTCHAs could be used in a hybrid challenge system. An entity could be presented simultaneously with a number of visual distinct word CAPTCHAs arranged in the form of a sentence. The entity is then required to read an entire sentence of words that are each visually confounded, thus increasing the chances that a computing system will fail to process such data in a reasonable time frame.

Speech Verification System for Detecting "Liveness" of Human User

Having considered the limitations of machine imposters, an explanation of a preferred embodiment of an audible-based challenge system is now disclosed.

Figure 2:
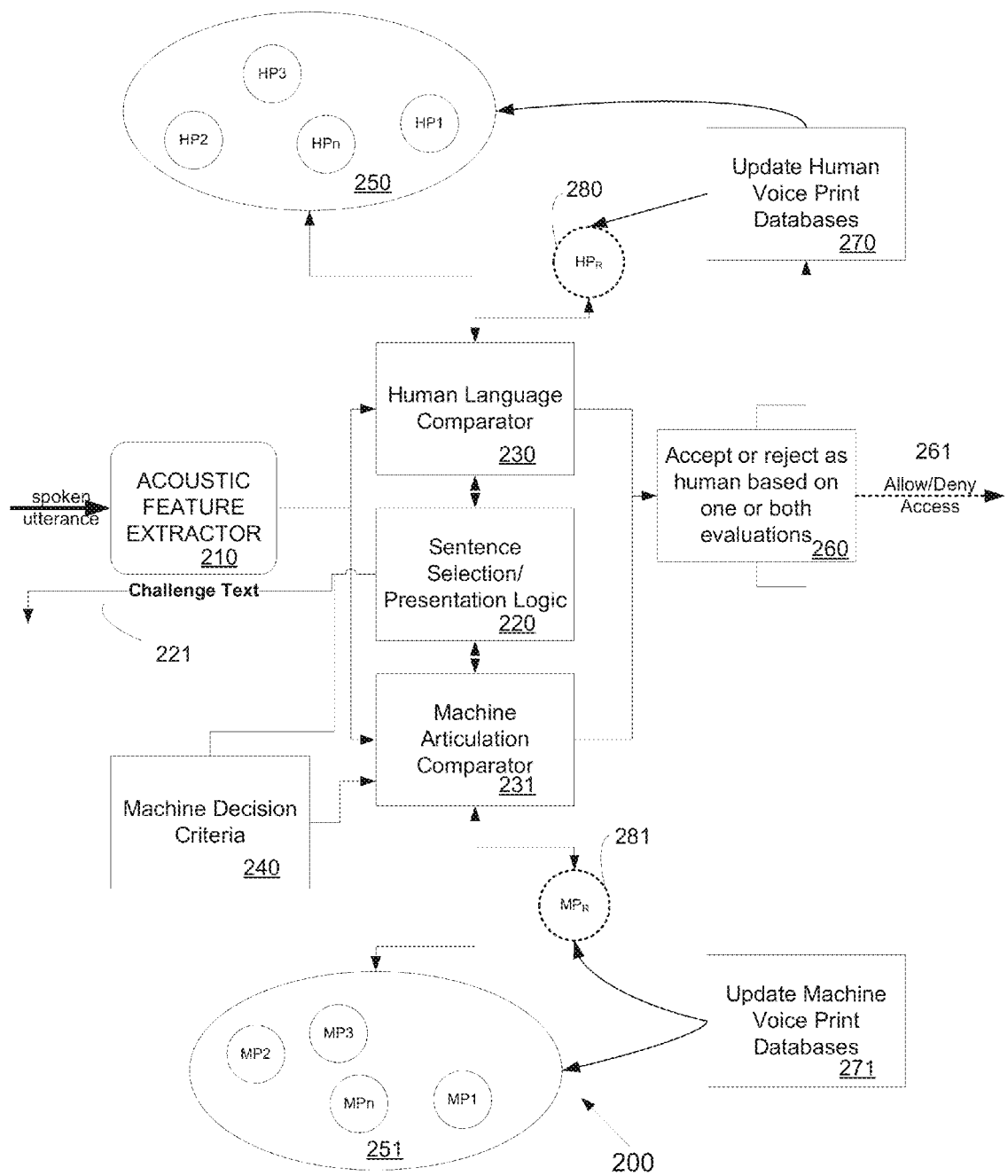
FIG. 2 shows a more detailed block diagram of the main components of a preferred embodiment of an audible-based challenge system of the present invention.

In a first preferred embodiment 200 shown generally in FIG. 2 advantage is taken of the fact that the human vocal tract is a highly complex acoustic-mechanical filter that transforms air pressure pulses into recognizable sounds in a manner that is not duplicatable (at this time) by a machine. Thus this embodiment exploits the difference between a conventional TTS loudspeaker based articulation, and a human vocal track articulation.

The architecture of the system is as follows: a spoken utterance (from a human or a machine) is captured by a routine 210. The types of routines suitable for capturing speech data from within a browser, or from a cell phone, are explained in detail in U.S. Pat. Nos. 6,615,172, 5,960,399 and 5,956,683 (Qualccomm) respectively. The current ETSI Aurora standard (ES 201 108 Ver. 1.1.3) available at an http site at portal(dot)etsi(dot)org/stq/kta/DSR/dsr.asp also describes such process and is incorporated by reference herein.

In conventional speaker verification systems, speaker identities are typically confirmed using a biometric evaluation of the speaker's articulation, which includes measuring such human traits as lung capacity, nasal passages and larynx size and storing these as physical biometric parameters within a template. A person's tongue can also influence their articulations. This same technique can be exploited here. Thus a speech utterance is captured, and selected acoustic features are extracted by a routine 210 which best correspond with—and identify—the particular biometric parameters unique to that person. Thus, it is well accepted that the audio spectrum of a voiced sound from a person inherently carries with it sufficient information to uniquely identify a vocal tract of such person and act as a biometric fingerprint.

The utterance is presented in response to a sentence selection/presentation logic routine 220, which is responsible for providing the user with appropriate content 221 to articulate. For example, the system may ask the user to speak the following sentence:

This is how we recognize speech

Other choices for the content to be articulated are discussed below in connection with FIGS. 3 and 4A-4C. The challenge item/content 221 may in fact be articulated by the challenge system with a request that the entity seeking access repeat the content. In other embodiments it will be desirable to overlay the present system with a conventional visual based system, so that, for example, the sentence above is shown as a sequential set of visually distorted words. By carefully selecting content for the verification based on known machine weaknesses the accuracy of the system in distinguishing between humans and machine imposters can be increased.

The appropriate acoustic features of the user utterance are then compared by a routine 230 to determine a best match HPn against a voice print 250 of a known human speaker. This aspect of the invention, so far, can simply be based on a conventional speaker verification system (such as one currently offered by Convergys) to perform one phase of the verification. A company known as voiceverified offers a similar solution at www(dot)voiceverified(dot)com.

The present invention goes beyond that, however, to cover instances where the speaker is unknown, but should still be given access. If the speaker is unknown, or if speed is a consideration, one alternative for a faster determination is to determine a distance to a nominal human voice print reference 280. Based on these results, the speaker may be either expressly identified (in the case of a human match) or only tentatively classified (in the case of no existing match) as a human speaker.

The other phase of the comparison simply modifies the prior art architecture to compare the unknown speaker utterance extracted features with a routine 231 against known machine speaker templates 251. Again if the speaker is unknown, or for speed purposes, one alternative for a faster determination is to determine a distance to a nominal machine voice print reference 280. Based on these results, the speaker may be either expressly identified (in the case of a machine match) or only tentatively classified (in the case of no existing match) as a machine speaker.

In a final evaluation, a comparison is made by a routine 260 against the closest human match HPn and the closest machine MPn to make a determination on whether the speaker is human or not. Based on the results of this algorithm, which may be implemented in any number of ways known in the art, a decision/output is provided at 261 to allow or deny access based on such confirmation. For some applications it may be desirable to further include a time element in the determination, so, that, for example, a user is given a certain period of time in which to articulate or identify the challenge item/text. The amount of time can be based on thresholds established from real world examples so that a human speaker is expected within a certain confidence level to return a response. If the speaker does not articulate the sentence within this period this factor may be used to weight the evaluation or in fact use it as an outright rejection depending on system requirements and specifications.

Note that in those cases where only a reference print is used, this aspect of the invention modifies the prior art system to discriminate not between individual users, but, rather, to determine simply if an entity providing an utterance has one or more measured vocal tract characteristics above certain thresholds.

The two verification routines can also be done in parallel, on different computing platforms adapted and optimized for each type of verification. Thus, for example, a first provider may be employed to determine a voice print of an utterance based on an ISP or other profile information for the user associated with the request. It is possible, for example, that certain population groups would be better identified by reference to a database of voice prints 250 unique to a certain online community/population. This would be faster than attempting to store/access a large database online of several million potential matches.

Some entities may have particular expertise in resolving/identifying human voices based on their expertise in classifying such voice prints. The invention contemplates scenarios, therefore, in which a machine decision criteria routine 240 may determine (based on a cost parameter, an accuracy parameter, a speed parameter, etc.) to allocate the task of classification to one or more verification providers (not shown) who in turn would each have their own voice print databases, verification logic, etc. Incentives could be provided to those entities responding more quickly, or more accurately, or with less cost.

In other cases it may be desirable to conduct an auction for the right to resolve the verification question. For such situations, a verification entity may opt to bid on specific types of utterances, depending on the language of the utterance, the purported identity of the user, the country of origin of the speaker, the type of sentence selection logic used, and so on. The bid may be in the form of a positive or negative credit, so that in some instances the verification entities have to pay a certain rate for the right to classify the speaker, while in others they may get a credit of some sort for performing such task.

All of the above would apply equally well to the machine voice print verification process. It is expected that different entities, over time, will develop unique libraries of machine voice prints that can used for such process. In some embodiments it may be desirable, therefore, to submit the task to multiple verifiers to ensure a more accurate response.

Techniques for creating libraries/databases of voice prints 250, 251 are well known. These systems are able to create digital voice "prints" 250 capturing the unique physical characteristics of a speaker's vocal tract. The set of voice prints 250 are created using standard enrollment procedures, which can be duplicated in embodiments of the present invention as well to create new voice prints if desired. For example in banking services, the user is prompted later to repeat a certain phrase or password to gain access to an account. Descriptions of such systems can be found in U.S. Pat. Nos. 6,356,868; and U.S. publication no. 25096906; and WO005020208 all of which are incorporated by reference herein.

Similarly speech processors which can create voice templates from acoustic features, and verify human identities from their vocal patterns are well-known in the art; for example systems by Scansoft (Speech Secure) and Nuance (Verifier) can perform this function. The aforementioned WO005020208 application uses a different form of voice-print which does not use spectral features, but is claimed to be more compact and efficient because it employs only sets of rational numbers which are invariant from utterance to utterance. Other suitable examples will be apparent to those skilled in the art.

Consequently, it is relatively simple to obtain a number of actual samples from live persons, with different enrollment words/phrases to store as reference voice templates 250, 251, and to generate reference voice templates 280, 281. Because most voice verification systems are text dependent, it is preferable that the number of enrollment words/phrases be relatively large, and augmented or changed on a regular basis, to make it difficult for a machine to "learn" any of the available choices. In any event, at the end of the verification process, the information from the speaker utterance is used to update a human/machine voice print databases 270, 271 respectively as needed.

To identify a closest voice print match, the human language comparator 230 and machine articulation comparator 231 may use a distance between vectors of voice features to compare how close they are to a particular person/machine. For example, the integral of the difference between two spectra on a log magnitude may be computed. Alternatively the difference in the spectral slopes can be compared. Other examples will be apparent to those skilled in the art.

In the absences of access to a library of voice prints, and to train/bootstrap these systems, it may be appropriate to create the human voice print reference 280 (and machine counterpart 281) by normalizing across a large sample to create a set of average pseudo-or human proxy representative vectors. The new sample utterance is then compared against such reference.

As seen in FIG. 2, the speaker is presented with a challenge item (in this instance text) to articulate. In other cases, the computer may ask the speaker to repeat a sentence as part of the challenge item content. The types of spoken challenge items preferably used in the present invention are described below with reference to FIGS. 3 and 4A-4C.

In some implementations the speaker may be asked to change their position relative to the microphone, such as by placing it closer or nearer in order to better characterize the acoustic features. Consequently a series of articulated challenges at different positions could be used to assess the nature of the speaker.

It can be seen that the preferred embodiment treats all humans essentially as one class of potential users of a computing system. Similarly, all machines are classified within a second class which is always excluded. Nonetheless it may be desirable in some embodiments to have humans which are excluded, and conversely machines which are expressly included. For example some environments may call for only authorized machines to participate.

Thus for some embodiments it may be desirable to use the system to exclude even human participants who are detected and matched against a human voice print associated with a person who is to be denied access. This would be beneficial in many instances for setting up accounts, to prevent users from setting up multiple accounts under different pseudonyms, such as is the common practice in online message board systems.

It may be advantageous to see that certain users should be excluded, even if they are human, due to undesirable behavior in other applications (i.e., duplicate accounts, spamming, terms of service violations, etc.) Such persons could be "locked out" by requiring them to sign in with their voice print when they attempt access. Since the system will "recognize" their voice by comparing to the prior stored template, the user can be denied access in this fashion.

Consequently in this variant of the invention even if a particular "authorized" user attempts to re-enroll in a different session with a different enrollment phrase/password, the present invention can implement the type of system described in Magee—U.S. Publication No. 2005/0125226 incorporated by reference herein, in which voice prints in a database are continually compared against each other for detecting fraud. If a "match" is determined within certain controllable thresholds, the user can be rejected from further access, or have privileges restricted or removed from any new account. This technique would allow detecting machine impostors as well attempting to create multiple personalities/accounts.

This variant of the invention is particularly useful in the area of web blogs, where spammers are now hiring large numbers of persons in third world countries to solve conventional CAPTCHAs implemented at blog sites. The intruders then post large number of spam posts which are undesirable. By using the present invention, a blog site could implement a standard one sentence enrollment test, on a case by case basis, depending on the origin of the enrollee (i.e., a standard CAPTCHA may be used for the remainder of users). After the enrollee "passes" the first test (i.e., he/she is not a machine) the voice print is stored. At a later time, if the same enrollee attempts to create a second account (for the purpose of creating more spam) the system would identify his/her voice, and prohibit such action, because it is difficult to alter one's voice consistently for the same challenge phrase. Alternatively, even if the enrollee is not immediately locked out, it is possible to simply disable access for the second account at a later time after detecting offline that the voice matches to a prior template.

Similarly the invention could be used to "differentiate" between nationalities, because foreigners speaking English tend to have pronounced accents and similar lack of correct prosody because they are not reared in the particular culture to understand certain nuances of language. Specific reference models could be created on a country by country/culture-by-culture basis. For example the system could be trained to distinguish between far east Indian English speaking persons and Hong Kong English speaking persons. Moreover many of them may have no English fluency whatsoever, so unlike the prior art which relies solely on a keyboard entry, imposing a spoken language test would eliminate such persons as potential intruders, because they could be detected by a number of the same tests imposed on machines noted above. Consequently the invention could be used to automatically lock out (or temporarily quarantine) new accounts originating from users of a certain region of the world which is demonstrated to be primarily spam driven, and further determined to be not reasonably likely prospective audience participants of a particular blog.

Thus the above methods could be easily employed on an IP address-by-IP address basis, so that only certain known foreign jurisdictions with a history of abusing the system may be scrutinized by the system to detect duplicate accounts. To comply with applicable laws concerning voice recordings the user could be presented with a waiver form, and/or the voice data could be actually "recorded" as a voice print in a computing system located in another jurisdiction.

Similarly, for the second class of cohorts, typically a challenge system will always deny access to machines. Nonetheless, it may be desirable in some instances to conditionally allow (or only allow) "authorized" machines to obtain access to computing resources, account services, etc. For example a challenge system may offer the entity an opportunity to present an authorization code as part of the process. If the machine can articulate the appropriate passcode, the challenge system may permit access under any appropriate or desirable terms. This may be useful, for example, when a person may want an electronic agent to access information, accounts, etc., and perform transactions on their behalf. In such cases the machine prints are not used to exclude, but rather to confirm the identity of the electronic agent as would be done with a conventional speaker verification system for human speakers.

Spoken Content Challenge Routine

Of course in any system that is designed to discriminate against a computer imposter one must deal with the inevitable compensation schemes which could be developed to counter the test being used as the determinant. Since the present invention is based on the notion that a computer imposter will not be able to accurately pronounce a randomly selected set of phones, it is useful to consider a few other parameters that can be adjusted to reduce the likelihood of an intruder "beating" the system, such as with a brute force scheme.

As noted above in some instances it may be desirable to discriminate between a human and a machine solely based on differences in acoustical characteristics in the articulated speech. In other words, without requiring any actual speech "recognition" per se to detect the content of the utterance for its correctness. For other applications it may be desirable nonetheless to detect that the articulated words (or an image) are indeed "correct" for the text in question, or for the challenge item presented as noted below.

From a basic perspective it is generally accepted that there are least 40 separate English phones, or separate sounds used to articulate words. This means that for a word that contains n phones the number of potential permutations of phones is approximately $_{40}P_n$ which is equal to $40!/n!$ which can be extremely large. Of course it may be easy to simply store a reasonably human facsimile of such phones for all actual English words which is much smaller. However this would have poor performance on transitions between phones compared to a diphone system. Moreover as noted above, the task of picking out the appropriate phone is complex as it depends on syntax, prosody, etc., so this can be used to gain an advantage over an imposter.

The more advanced TTS systems may use diphones, which are slightly more accurate for reproducing speech. Generally speaking diphones are combinations of phones, which means that there are approximately 1600 of such in the English language. Nonetheless there are probably only 200-300 "in use" diphones within the grammar of English words. Even with that limitation, however, it can be seen that the for a simple sentence of only a few words that contains N contiguous diphones, the number of unique sounds to be reproduced is at a minimum $20*10^N$. Thus, even when N is only in the range of 10 or higher, this type of articulation challenge very rapidly moves out of the realm of a brute force solution.

Moreover there may be some diphones which, due to their nature, are much more difficult to reproduce, and thus more susceptible to detection. These can be experimentally identified as noted below, and exploited to impair a machine intruder.

Accordingly sentence selection/presentation logic 220 is another aspect of the invention which can be tailored specifically to exploit machine weaknesses and human strengths. To wit, this routine is responsible for selecting and presenting the content to the utterance speaker. By careful selection of such content, the chances of detecting a human versus a machine can be increased dramatically.

Figure 3:
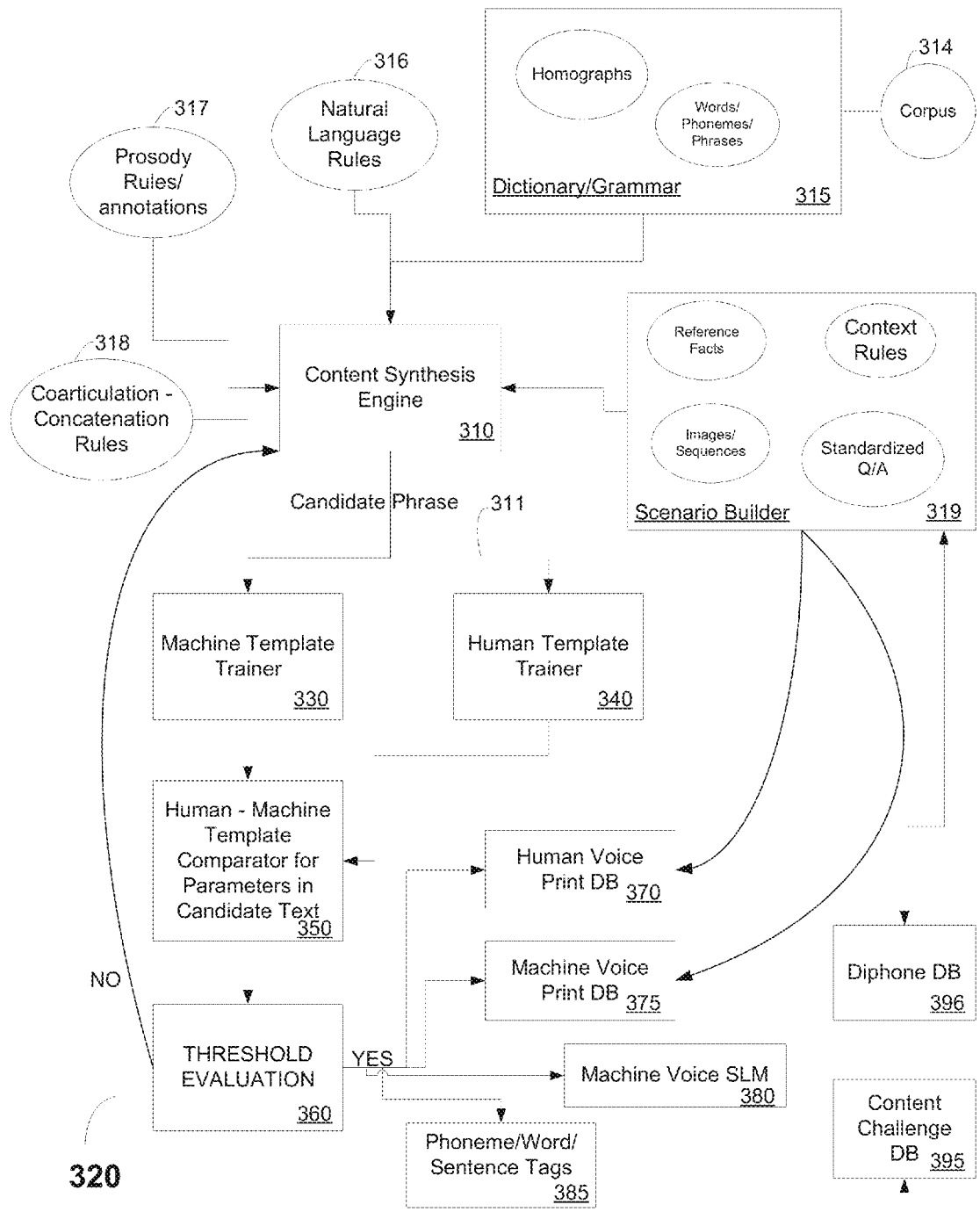
FIG. 3 shows a detailed block diagram of the main components of a preferred embodiment of a content challenge compilation system of the present invention.

A more detailed diagram of the basic architecture for a content selection challenge routine 320 is shown in FIG. 3. The main component in this instance is a content (in a preferred embodiment a sentence) synthesis engine (CSE) 310, which receives a variety of data inputs and uses a variety of rules and scenarios to output/construct appropriate content challenge items which can be used by a content challenge routine 220 (FIG. 2). These candidate sentences are tested against machine and human trainers to develop a suitable body of challenge sentences in a database 395.

One body of information which the CSE routine draws upon is a dictionary—grammar 315. The latter is preferably populated by an entire set of conventional words, phonemes, phrases, etc. for a particular language, as well as a database of homographs, built from a corpus 314. Homographs are words which are spelled the same, but which have different pronunciations. A human reading a sentence with a homograph (like the words "read," "close" and the like) can be expected to readily perceive the correct context of a word, while a computing machine is likely to require additional time to understand the syntax of a sentence. This time factor, again, can be exploited to differentiate and score the utterance. Thus one basic strategy would be to employ sentences with homographs to handicap a machine intruder.

The CSE engine 310 also has access to natural language rules 316, prosody rules 317, coarticulation/concatenation rules 318 and a scenario builder 319. These reference rules help the CSE construct appropriate challenge sentences and acceptable pronunciations based on the guidelines noted above.

For example to develop a set of content challenge items 395, a variety of sources and strategies could be used. In a first technique, one starts off with a reference corpus 314 of raw prose from any of a number of sources (newspapers, books, Internet, etc) to develop a set of evaluation sentences having a word form W1+W2+W3+... Wk and an associated diphone sequence: {P1$a$, P1$b$, P1$c$} {P2$a$, P2$b$} {P3$a$, P3$b$, P3$c$}+... {Pka} and so on. Each of these are then processed with applicable rules 316, 317, 318, etc. to form a candidate sentence 311 that is then evaluated according to various criteria (elaborated below) to determine if it is a useful and suitable discriminator between a live human and a machine imposter. If it turns out to be an appropriate choice it is placed into challenge item set database 395, and presented as one of the options for a challenge item as seen in FIG. 4A in the form of explicit text. As noted earlier, for additional security it may be desirable to visually scramble the words using a visual CAPTCHA technique first, and then present the same for articulation. In this hybrid scenario, both acoustic and content features are measured to increase the difficulty of the challenge item for a computing system. To further increase the duration of the challenge (and hence make it unattractive to automated systems) the visual images (which could include depictions of objects and not just distorted text) could be presented in a deliberately paced manner so as to reveal the details over time. Thus the full image would not be revealed until 30 seconds, but would be improved gradually with additional visual details during successive iterations every 4 or 5 seconds. The system could take into account the time it takes an average person to provide the correct answer for the gradually revealed image as part of the scoring.

Referring again to FIG. 3, a second technique would involve working backwards, by identifying and compiling a list of diphones and concatenations in a database 396 which are known confounders for TTS systems. From this set of confounders a set of candidate sentences could be automatically constructed or located in a dictionary/grammar 315. In essence, the strategy here is to measure a set of concatenation gaps/discrepancies for each diphones. Based on developing and sorting such list to identify a preferred set of distinctive diphones 396 that are most likely to confound a TTS system, the system selects sentences from the corpus containing multiple confounding phones, or constructs them from scratch as noted. When constructing sentences from scratch it may be desirable in some cases to use some random word sequences and without considering syntax rules. Thus the end result should be a set of random sentences constructed from word/phoneme patterns which are extremely difficult (i.e. detectable) for a machine to imitate in human form.

A third technique would combine the challenge sentence with a visual cue of some sort to induce a prosodic response. These can be determined experimentally with reference to a human population by giving an assortment of sentences and visual cues and measuring a response given to the challenge sentence. An example is given in FIG. 4B in the form of a question that the speaker must respond to, and preferably provide an answer that falls into a category of acceptable responses. Thus the challenge item set database 395 would include such additional cue data as well.

The visual cues could request information from the speaker such as shown in FIG. 4B, along with other cues if necessary, such as text that explicitly reads:

He's hitting a ball
He's fishing
He's driving a car
He's reading a book
He kicked the cat
etc., to help give a roadmap to a human speaker.

Note, too that the visual cues can be tested with a population of humans to determine which ones are most likely to induce a preferred set of reference prosodic characteristics. Since it is desirable to exploit this difference over machines, it would be useful to identify those visual cues that result in a maximal prosodic difference over a reference computer synthesized voice and store these in a database along with their prosodic scores. These examples can be easily determined with routine experimentation, and can be tailored if desired to a detected gender/demographic of the entity attempting access. Thus the challenge items and associated cues can be customized within the database with fields pertaining to a particular estimated audience that is attempting access. The initial determination of gender, age, demographics, etc., can be done using any number of known techniques.

A fourth technique would rely on a lack of any explicit text cues. Instead it would offer up a set of pictures/images/cartoons with a prompt for the speaker to give a free form response. The responses are then tabulated and correlated to identify a set of thresholds identifying an acceptable response. For example, in response to picture A, the set of responses included X-50%, Y-35%, Z-5%, other 10% and so on. A statistical profile can then be used against an entity attempting access to see if the response matches one of the human provided answers in the reference set. As before, the images can be tested and optimized by reference to prosodic scores as well so that a database of preferred challenge items is developed.

An example of this is shown with reference to FIG. 4C. The challenge item may be in the form of a bubble reader, that asks an open ended question like "what did this person say" or "what is this person doing"? etc. Specific suggestions can be given to the speaker, as well, to induce an accurate human response. Other basic questions might include facts which the speaker will know without reference to another source, such as:

*what is your full name?
*describe for me what color your clothes are
*tell me what you ate for breakfast?
*tell me all the good things that come to mind when you think about your mother?

The example sets can be augmented with collaborative filtering technology as well, so that correlations can be developed between humans on appropriate responses to challenge items. Thus, if two humans responded with the same answers to multiple challenge items, these individuals' profiles can then be compared to an unknown speaker to present yet another form of human identity detection. For example, if a large percentage of persons who see X say A in response, and such persons also, upon seeing Y say B in response, than a content challenge item can be presented to show both X and Y to detect the same correlation in responses. Of course such test may not determinative but it can act as a further overlay in the access determination along with the required correct pronunciation of the words in question.

Along the same lines the challenge item could be presented in the form of a game or puzzle in which an image or a set of words could be presented to the entity with a request to predict or guess the next item in sequence. The items could be selected, again, based on a Bayesian type analysis of actual interviews with humans which solicit specific responses based on human associations. For example in the color sequence:
Green
Yellow
(please fill in the blank)
A very common choice would be red, representing the colors on a traffic light.
Other examples for other applications will be immediately apparent to those skilled in the art.

Similar evaluations of prosody scores can be made to identify prosodic characteristics of particular challenge items. By identifying and ranking common prosodic elements presented by humans in articulated sentences, the system can use such scores to compare against an unknown entity for prosodic (dis) similarities.

As noted, scenario builder 319 is the entity which is responsible for compiling appropriate qualified content to be evaluated, as well as to create the pictorial challenge item sets shown in FIG. 4B and 4C. This can be done by reference to a library of images/sequences, reference facts, context rules, question and answer sets, etc. To determine this set a supporting routine may examine logical explicit tags provided by humans on the Internet for image data and the like. For example a website or search engine may contain an image with the tags Cat, Pet provided by human taggers for a picture of a household cat. This tagging data then provides a reasonable starting point for which to provide the explicit cues in the aforementioned figures along with the challenge item text.

In other instances the scenario builder may suggest a sequence of question/answer sets to be used for the challenge item content, so the accessing entity is effectively engaged in an interactive dialog session. In this manner the timeliness and naturalness of the responses could be evaluated over a series of multiple questions. Simple questions such as "tell me what you are wearing" would get a first answer, and a follow-up could be built dynamically—based on the detection that the entity said ". . . a shirt"—to ask what color the garment is, and so on. An example of another question would be "What movie have you seen recently." If the answer was "Star Wars," for example, the system could follow up with "who played Darth Vader" or "who was your favorite character," or some other pre-stored question/answer associated with the movie, subject to the limitations of maintaining a database of suitable questions and answers. Similar questions could be posed for books, music, sporting events, job occupations, etc., Again the questions and content could be randomly selected and based on a selection of content that is known to present challenges for a machine. The user could be prompted to pick which 1 of a series of topics he/she would like to talk about. Thus a series of Q/A scenarios could be designed and presented to better weed out improper entities, since the likelihood of detection would increase with each utterance.

Looking again at FIG. 3 the candidate sentences 311 can be presented to one or both of a machine template trainer 330 or a human template trainer 340. These routines can be embodied in separate computing systems which are adapted to measure and catalog an individual person/machine's articulation of the candidate sentence from a group of such entities. Thus each is responsible for compiling a set of voice prints representing a group set of reference articulations for the candidate sentence. For example, a set of M different machine TTS systems could be presented with the challenge of articulating the candidate sentence 311, and their responses catalogued and stored. This would aid, for example, in developing a library of known TTS cohorts evaluated with respect to the candidate sentence. Later, during a verification process, an initial determination can be made as to which computing entity best correlates to a particular utterance. Based on such determination a challenge sentence or text can be selected that best discriminates for such machine.

Similarly a group of N different persons with different demographics could be tested in the same way to develop a set of voice prints for the sentence in question. In a preferred embodiment the sentences could be presented in connection with an online gaming site, so that the articulator data is easily collected from a wide population base and without having to resort to specialized groups or expense.

Routine 350 is then responsible for measuring the individual differences between each of the N human audible responses and the M machine audible responses. As noted these differences can be calculated in any number of ways known in the art. This can be compiled in the form of a table/matrix to determine those candidate sentences offering the greatest promise in terms of their ability to differentiate between humans and machines because the distance for such candidates is the greatest. Thus, for example, a threshold evaluation routine 360 may be set to choose only those candidate sentences which represent the highest X % difference in human vs. machine renderings. For example, the top 5% or 10% may be selected to become part of the challenge item set database 395. The exact criteria will vary according to each application of course according to the desired speed/accuracy/security requirements imposed.

As a supplement to the scoring routine 350 could present the candidate sentence articulations to a group of human evaluator/raters to collect their vote or opinion on the liveness of the entity (human or machine) responsible for the utterance. The numbers and percentages of acceptance/rejection can be tallied for each candidate sentence as articulated by the M machines. This rejection factor can be used as well for systems which may simply employ a non-automated challenge evaluation, or as an initial filter for reducing a set of candidates for the final challenge item set database. That is, an initial set of candidate sentences may be filtered by a group of human observers, and the ones which nonetheless least human like could be then subjected to more extensive processing to identify more precisely the acoustic differences resulting in the non-human signature. This examination can be done for each machine entity to develop a library of known acoustical differences for different candidate challenge items. This way, after an initial determination is made as to the likely identify of an entity, a randomly selected challenge item can be presented to each that is nonetheless designed to exploit the largest known (significant) deviation from a reference human voice.

In those situations where a candidate sentence is considered appropriate for the challenge item set, the individual human voice print database and machine voice print databases can be updated. Again, as noted above, it may be useful to compile a simple reference template representing each collective entity (i.e., HPr 280, MPr 281) as noted above using aggregate statistics for the entities measured. A notation can be made by a routine 385 to note that the phones/words in question resulted in a useful candidate, and this information again can be used as seed information for finding and retrieving other similar candidates likely to perform well. The individual distinctive diphones can also be stored as desired for later use in a set 396.

In some embodiments it may be desirable to construct a statistical language model of machine TTS system behavior to help uniquely identify particular machine entities, and to better characterize overall expected machine articulations.

This machine SLM 380 in turn can be used by the machine articulation comparator 231 (discussed above) to further uniquely identify a machine imposter rendition of a challenge sentence. To further train and refine the SLM 380 the system could solicit repeated samples of the same words and phrases to better characterize a signature of a particular unique machine. Moreover to further train the SLM to behave like a human ear, the set of sentences which are uniformly rejected at a high rate by humans can be used as a seed set for training. This will have the effect of biasing the SLM 380 to hear content that is preferred by the human ear for discriminating against a machine imposter.

Through sufficient training samples the system should be able to identify, with controllable confidence levels, an appropriate set of sentences that are likely to weed out a machine imposter. Moreover candidate sentences which are confusing or take too long for a human can be eliminated as well. Again it is preferable that the challenge sentences include primarily samples that are rapidly processed and articulated as measured against a human reference set. The respective times required by human and machines can also be measured and compiled to determine minimum, maximum, average, mean and threshold times. For example, it may be desirable to select challenge sentences in which the time difference between human and machine articulations is greatest.

Embodiments of the invention may be used with machines, devices and systems which use a speaker verifier option in accordance with the media resource control protocol (MRCPv2). This protocol allows for speaker verification using a voice authentication methodology that can be used to identify the speaker in order to grant the user access to sensitive information and transactions. It will be apparent from those skilled in the art that this same protocol could be adapted (including with a new dedicated command) to initiate requests for verification of an entity as a human or an authorized machine agent.

As the proliferation of speech recognition based applications continues, the present invention can be used to detect what might be referred to as "cluck" fraud in the form of improper selections of ads, access to accounts, etc. This would be a superior form of fraud detection since there is no practical mechanism for detecting if a keyboard/mouse selection of an ad is fraudulent.

Finally, it will be apparent to those skilled in the art that the methods of the present invention, including those illustrated in FIGS. 1, 2, 3 and 4 can be implemented using any one of many known programming languages suitable for creating applications that can run on client systems, and large scale computing systems, including servers connected to a network (such as the Internet). The details of the specific implementation of the present invention will vary depending on the programming language(s) used to embody the above principles, and are not material to an understanding of the present invention.

The above descriptions are intended as merely illustrative embodiments of the proposed inventions. It is understood that the protection afforded the present invention also comprehends and extends to embodiments different from those above, but which fall within the scope of the present claims.

What is claimed is:

1. An automated method for generating Completely Automated Public Turing Test to Tell Computers and Humans Apart (CAPTCHA) challenge items with a CAPTCHA computing system, comprising:
   generating a set of candidate CAPTCHA challenge items with a CAPTCHA synthesis engine operating on the CAPTCHA evaluation computing system, such that each candidate CAPTCHA challenge item includes a CAPTCHA question and a target CAPTCHA answer;
   presenting a first computer system with said set of candidate CAPTCHA challenge items;
   determining, with the first computer system, machine answers to the candidate CAPTCHA challenge items;
   with the CAPTCHA computing system and based on said machine answers, measuring an ability of said first computer system to correctly determine said target CAPTCHA answers;
   identifying with the CAPTCHA computing system, based on said measuring, at least a first candidate CAPTCHA challenge item of the set of candidate CAPTCHA challenge items for which said machine answers do not meet a threshold of acceptability and selecting the first candidate CAPTCHA challenge item as a selected CAPTCHA challenge item; and
   storing said selected CAPTCHA challenge item.

2. The method of claim 1, wherein the CAPTCHA computing system further determines whether the answers to the candidate CAPTCHA challenge items originated from a human or a machine by measuring acoustic characteristics of spoken answers.

3. The method of claim 2, wherein the acoustic characteristics comprise prosodic characteristics.

4. The method of claim 2, wherein the CAPTCHA computing system further determines whether the answers to the candidate CAPTCHA challenge items originated from a human or a machine by processing the answers with a natural language engine and comparing the answers with statistical profiles of answers provided by humans to the same candidate CAPTCHA challenge items.

5. The method of claim 1, wherein said generating further comprises:
   generating a prosodic articulation score for each of the candidate CAPTCHA challenge items during said measuring
   generating the at least one selected CAPTCHA challenge item from one of the candidate CAPTCHA challenge items if the prosodic articulation score for that CAPTCHA challenge item exceeds a defined threshold.

6. The method of claim 5, further comprising storing the at least one selected CAPTCHA challenge item in a database with the score for such item.

7. The method of claim 1, further comprising:
   presenting the at least one selected CAPTCHA challenge item to an entity seeking access to a computer resource;
   collecting and processing a response from the entity using the CAPTCHA computing system; and allowing the entity access to the computer resource based on an identification of the spoken response as having been generated by a human or a machine.

8. The method of claim 1, wherein the set of candidate CAPTCHA challenge items include visual cues intended to elicit a spoken prosodic response.

9. The method of claim 8, wherein the set of candidate CAPTCHA challenge items also include textual cues.

10. The method of claim 1, wherein the set of candidate CAPTCHA challenge items are textual questions.

11. The method of claim 10, wherein the textual questions are open ended.

12. An automated method for generating spoken Completely Automated Public Turing Tests to Tell Computers and Humans Apart (CAPTCHA), comprising:
 presenting a computer system with candidate cues for spoken CAPTCHAs;
 determining, with the computer system, answers to the candidate cues and generating one or more spoken answers using a text-to-speech (TTS) system;
 measuring an ability of a spoken CAPTCHA system to correctly determine whether the answers to the candidate cues are spoken by a human or a machine by measuring acoustical characteristics of the spoken answers;
 generating a score for each the candidate cues based on an ability of the spoken CAPTCHA system to determine correctly whether the answer to the candidate cue was spoken by a human or a machine;
 choosing at least one spoken CAPTCHA cue from one of the candidate cues if the score for that candidate cue exceeds a defined threshold; and
 storing the at least one spoken CAPTCHA cue in a database with the score for the spoken CAPTCHA.

13. The method of claim 12, wherein the acoustic characteristics comprise prosodic characteristics.

14. The method of claim 12, wherein the spoken CAPTCHA system further determines whether the answers to the candidate cues are articulated by a human or a machine by processing the answers with a natural language engine and comparing the answers with statistical profiles of answers provided by humans to the same candidate cues.

15. The method of claim 12, wherein the candidate cues are visual cues intended to elicit a prosodic response.

16. The method of claim 15, wherein the candidate cues also include textual cues.

17. The method of claim 12, wherein the candidate cues are textual questions.

18. The method of claim 17, wherein the textual questions are open ended.

* * * * *